Aug. 24, 1943.    C. W. ATTWOOD    2,327,587
BAR-STOCK RACK
Filed March 30, 1943    2 Sheets-Sheet 1

INVENTOR.
CHARLES W. ATTWOOD
BY
Swan, Frye & Hardesty.
ATTORNEYS

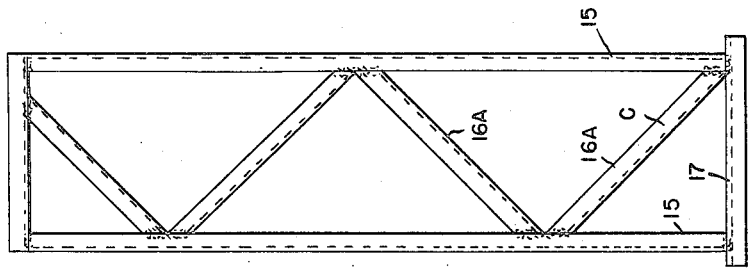
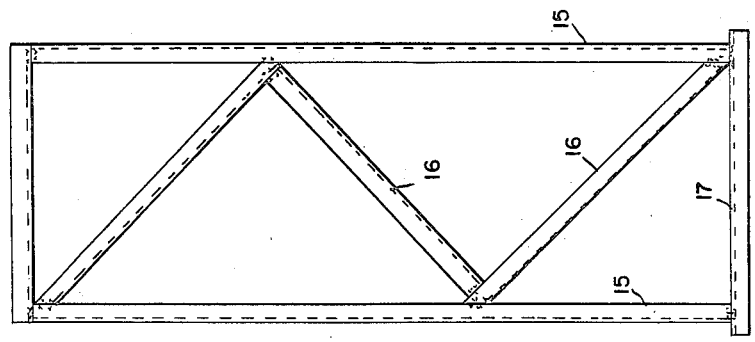
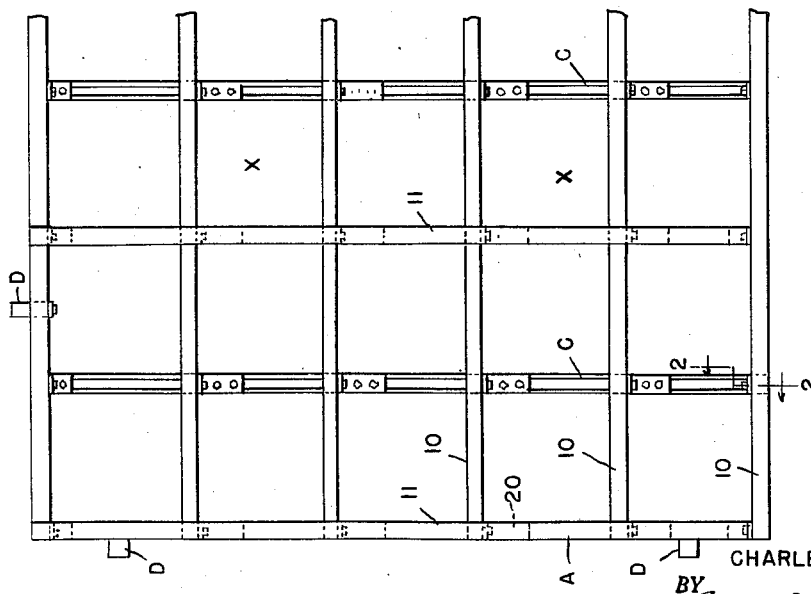

Patented Aug. 24, 1943

2,327,587

UNITED STATES PATENT OFFICE 2,327,587

BAR-STOCK RACK

Charles W. Attwood, Wayne, Mich.

Application March 30, 1943, Serial No. 481,122

4 Claims. (Cl. 211—60)

The present invention relates to bar stock racks and specifically to racks which may either be prepared as sub-assemblies and shipped in knocked-down form or completely assembled at the place of use.

Among the objects of the invention is a rack in which the storage spaces for stock may be changed, if desired, with a minimum of work and without disfigurement of the material.

Another object is a rack in which, while the parts are bolted together, there are no bolt heads or other projections to interfere with the insertion of the stock.

Another object is a rack which may consist of a number of units, each of which is complete in itself, fixed in alignment.

Another object is a rack of such construction that all of the parts may be salvaged in case of discontinuance of its use as a rack, and are in condition for use for other purposes.

Still other objects and advantages will be apparent to those skilled in the art upon reference to the following description and the accompanying drawings in which Figure 1 is a perspective view of the rack as formed of two units.

Figure 3 is a side elevation of a portion of one of the units shown in Figure 1.

Figures 4 and 5 show elevational views of two forms of brace members.

Figure 1:
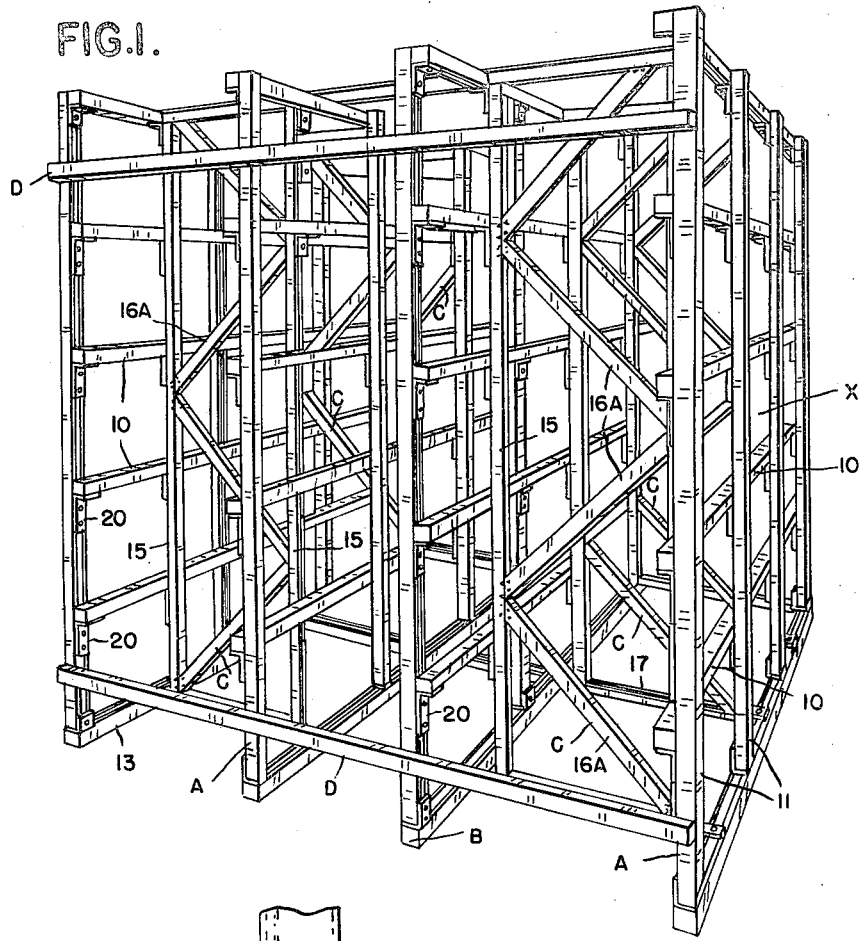

As shown clearly in the drawings, a rack made according to the present invention consists of one or more units fixed together and maintained in alignment by a plurality of rails fixed to two or more units and holding them in place.

Each unit consists of two frames A and B fixed together by a plurality of brace members C and the units fixed together by the rails D.

Each frame A or B consists (Figure 3) of a plurality of horizontal members 10, arranged parallel and suitably spaced, fixed to a plurality of vertically arranged, spaced parallel members 11.

It is preferred to space the members 11 twice the distance of the spacing of members 10 so that the brace members C may be fixed halfway between the members 11 to provide square openings X as stock storage space. Any other suitable spacing may, however, be used.

Each of the brace members C consists of two vertically arranged spaced parallel members 15 (see Figures 4 and 5) having diagonal bracing elements 16 or 16A extending between them and preferably welded in place and also having horizontal members 17 welded thereto at the top and bottom.

In Figure 4 the four diagonals 16A are shown as being welded directly to the verticals 15 while in Figure 5, the intermediate diagonal 16 is shown as welded to the other two.

Figure 2:
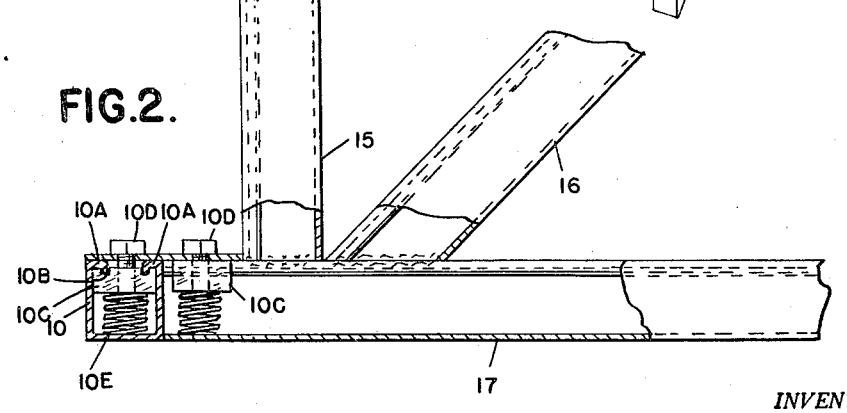
Figure 2 is a sectional view on line 2—2 of Figure 3.

All of the members 10, 11, 15, 16 and 17 are identical in cross section and such a cross section is shown in Figure 2 at 10. In this figure, the member is shown as a channel having the edges of its free side walls turned toward each other to form flanges 10A and having the edges of these flanges turned inwardly as indicated at 10B.

If desired, the nuts may be provided in the bottoms of the grooves with corrugations, teeth, or suitable other roughness to supply additional means to prevent movement after assembly.

In assembling the several parts to produce the frames and the completed units, angle pieces 20 will be used. These, it will be noted, are fixed in place preferably by two bolts for the vertical portion, and are all arranged in line with the vertical members 11 and 15. The two bolts provide against any possibility of slippage of the parts while the location provides against any projection into a space X.

When the angles 20 are bolted to both vertical and horizontal members they supply a sufficient bracing against endwise collapse of the unit, collapse in the other direction is, of course, prevented by the brace units.

Now having described the invention and the preferred embodiment thereof, it is to be understood that the invention is to be limited not to the specific details herein set forth, but only by the scope of the claims which follow.

I claim:

1. A bar-stock rack comprising a unit consisting of a pair of frames, connecting brace elements arranged at right angles thereto and bolted to said frames, each of said frames consisting of a plurality of spaced vertical channel members and a plurality of spaced horizontal channel members bolted together, and means for bolting said brace elements to the said horizontal frame members intermediate the points of attachment of the latter to the vertical frame members.

2. A bar-stock rack comprising a unit consisting of a pair of frames, connecting brace elements arranged at right angles thereto and bolted to said frames, each of said frames consisting of a plurality of spaced vertical channel members and a plurality of spaced horizontal channel members bolted together, and each of said brace elements consisting of vertical members connected at their ends by horizontal and intermediate their ends by diagonal members welded thereto, and means for bolting said brace elements to the said horizontal frame members intermediate the points of attachment of the latter to the vertical frame members.

3. A bar-stock rack comprising a unit consisting of a pair of frames, connecting brace elements arranged at right angles thereto and bolted to said frames, each of said frames consisting of a plurality of spaced vertical channel members and a plurality of spaced horizontal channel members bolted together, and means for bolting said brace elements to the said horizontal frame members intermediate the points of attachment of the latter to the vertical frame members, each bolted connection including an angle plate bolted to the members and located upon a face of a member parallel to the plane of a frame.

4. A bar-stock rack comprising a unit consisting of a pair of frames, and connecting brace elements arranged at right angles thereto and bolted to said frames, each of said frames consisting of a plurality of spaced vertical channel members and a plurality of spaced horizontal channel members bolted together, the bolting means consisting of nuts in said channels, angle plates, bolts passing through said plates into said nuts and means to prevent said nuts from moving lengthwise of said channels when said bolts have been tightened.

CHARLES W. ATTWOOD.